US006249251B1

(12) United States Patent
Chang et al.

(10) Patent No.: US 6,249,251 B1
(45) Date of Patent: Jun. 19, 2001

(54) HARDWARE-EFFICIENT DEMODULATOR FOR CDMA ADAPTIVE ANTENNA ARRAY SYSTEMS

(75) Inventors: Kyung Hi Chang, Taejon; Hyung Rae Park, Kyunggi-Do; Mun Geon Kyeong, Taejon; Eung Soon Shin, Taejon; Yang Gi Kang, Taejon; Youn Ok Park, Taejon, all of (KR)

(73) Assignee: Electronics and Telecommunications Research Institute, Taejon (KR)

( * ) Notice: Subject to any disclaimer, the term of this patent is extended or adjusted under 35 U.S.C. 154(b) by 0 days.

(21) Appl. No.: 09/435,039

(22) Filed: Nov. 5, 1999

(30) Foreign Application Priority Data

Jul. 12, 1999 (KR) ................................. 99-28020

(51) Int. Cl.[7] ............................... G01S 3/16; G01S 3/28; H01Q 3/26; H04B 7/10; H04L 1/02
(52) U.S. Cl. ......................... 342/378; 342/368; 342/383; 375/144; 375/347
(58) Field of Search .................................... 342/368–378, 342/383; 375/144, 347

(56) References Cited

U.S. PATENT DOCUMENTS

| 5,602,555 | | 2/1997 | Searle et al. ........................ 342/374 |
| 5,621,752 | | 4/1997 | Antonio ............................. 375/200 |
| 5,748,683 | | 5/1998 | Smith ................................ 375/347 |
| 6,064,338 | * | 5/2000 | Kobayakawa et al. ............. 342/378 |

OTHER PUBLICATIONS

"Performance of Wireless CDMA with M–ary Orthogonal Modulation and Cell Site Antenna Arrays" by Ayman F. Naguib et al., IEEE Journal on Selected Areas in Communications, vol. 14, No. 9, Dec. 1996, pp. 1770–1783.

"Smart Antenna Arrays for CDMA Systems" by John S. Thompson et al., IEEE Personal Communications, Oct. 1996, pp. 16–25.

"An Adaptive Antenna for CDMA" by Y. J. Guo et al., IEEE 0–7803–4281–X/97, pp. 590–594.

* cited by examiner

Primary Examiner—Thomas H. Tarcza
Assistant Examiner—Fred H. Mull
(74) Attorney, Agent, or Firm—Antonelli, Terry, Stout & Kraus, LLP (57) ABSTRACT

In the hardware-efficient demodulator for a CDMA adaptive antenna array mechanism of a mobile radio communication system, a correlators bank receives digital baseband signals received through an antenna array of a base station and computes correlation values with a local code sequence. A beamformer receives the digital baseband signals and the correlation values from the correlators bank and calculates beamforming weight vectors. A searchers bank receives the digital baseband signals and calculates an initial acquisition and reliable timing information for a multipath search by a common work with the beamformer, which uses a beamforming algorithm. A beamforming complex multiplier for a finger performs a complex multiplication for the beamforming weight vectors and the digital baseband signals, and sums up them. A finger bank receives output signals from the beamforming complex multiplier, executes a code tracking for an alignment between a transmission code and a phase by each multipath on the basis of the multipath search timing information to then provide the timing information of the multipath tracking to the correlators bank, and outputs signals of dispreaded multipath through a time alignment based on each path. A multipath combiner performs a multipath combination for the output signals of the finger bank on a time base and outputting it.

7 Claims, 3 Drawing Sheets

HARDWARE-EFFICIENT DEMODULATOR FOR CDMA ADAPTIVE ANTENNA ARRAY SYSTEMS

BACKGROUND OF THE INVENTION

1. Field of the Invention

The present invention relates to a hardware-efficient demodulator, and more particularly, to a hardware-efficient demodulator for a CDMA adaptive antenna array mechanism in a mobile radio communication system.

2. Description of the Related Art

A CDMA system does not require a specific reference signal necessary to apply an adaptive antenna array to the system, differently from a TDMA system since the CDMA system utilizes a code sequence. Thus the CDMA system is basically suitable to a use of an antenna array.

The TDMA systems mainly employ algorithms using a spatial reference signal such as MUSIC, since the number of interference signals are small and power quantity of each interference signal is large therein. But, the CDMA system can not use such algorithms as MUSIC having a limitation in a nulling performance of the interference signal, since there exist a plural number of interference signals having a small power quantity of an interference therein, the limitation being caused according to the number of array-antenna elements.

Since the existing CDMA mobile radio communication systems generally combine only information provided in a temporal region by using a rake receiver, information of a spatial region can not be utilized. And, problems are caused in aspects of coverage, system capacity and transmission capability of high-rate data.

Further, the CDMA system mainly had an application of an algorithm considering the code sequence as the reference signal, but it was not especially done some endeavor for minimizing a size of a hardware and maximizing its performance improvement, maintaining a systematic merit of the existing and embodied CDMA system as it is. Besides, in a case of a blind algorithm which does not have a necessity for a specific reference signal and directly computes beamforming weight vectors without a prediction for a direction of an arrival(DOA), there are many cases as a convergence problem.

A CDMA system not having a use of the adaptive antenna array, generally combines only information provided in a temporal region through a rake receiver, then uses it. Meantime, a CDMA system using the antenna array can simultaneously utilize not only information of the temporal region but also information of a spatial region, accordingly it is needed a demodulator based on an efficient hardware structure capable of using such information.

SUMMARY OF THE INVENTION

Accordingly, the present invention is directed to a hardware-efficient demodulator for a CDMA adaptive antenna array system that substantially obviate one or more of the limitations and disadvantages of the related art.

A primary object of the present invention is to provide a hardware-efficient demodulator for a CDMA adaptive antenna array mechanism in a mobile radio communication system, which is capable of minimizing a complicated extent in embodying the demodulator and maximizing a performance improvement through a beamforming.

To achieve the object of the present invention as embodied and broadly described, a hardware-efficient demodulator for a CDMA adaptive antenna array mechanism in a mobile radio communication system may be classified according to each use into a first demodulator for selecting a chip-level beamforming, a second demodulator for selecting a symbol-level beamforming, and a third demodulator having a compromised structure of the first and second demodulators.

The first demodulator for selecting the chip-level beamforming which minimizes an embodying complication extent, has only fingers of the number same as its number in a typical rake receiver and requires specific searchers whose number is ((number of selection diversities) X (number of searchers in conventional CDMA system without antenna array)).

The second demodulator for selecting the symbol-level beamforming which maximizes a performance improvement through a beamforming, has a shortcoming that an overall hardware complication extent is increased by the definitely increased number of the fingers in comparison with the first demodulator based on the selection of chip-level beamforming, but it has a merit that the demodulator is a little influenced from finite word-length effects by multiplying the beamforming weight vector by the dispreaded symbol-level traffic signal etc. in comparison with the demodulator having a selection of the chip-level beamforming. In the second demodulator, further, a reliable initial acquisition and the time information for a multipath search are computed by using the searchers, whose number is same as the number of antenna elements, instead of the beamforming for a searchers bank by selection diversity.

The third demodulator based on a compromised structure of two demodulators mentioned above performs the chip-level beamforming having the symbol-level searcher beamforming, to thus maintain a low complication extent in embodying the demodulator, simultaneously maximize a performance improvement. In this demodulator, the overall hardware-complicated extent is reduced in comparison with the demodulator having the selection of the symbol-level beamforming, simultaneously the reliable initial acquisition and the timing information for the multipath search are generated to maximize the performance improvement by using the beamforming algorithm instead of the searcher beamforming through the selection diversity.

In accordance with a first inventive characteristic, a demodulator for the CDMA adaptive antenna array system is composed of a correlators bank unit for receiving digital baseband signals $r_1(k), r_2(k), \sim, r_M(k)$ of a chip-level received through an antenna array of a base station and computing correlation values with a local code sequence; a beamforming unit for receiving the digital baseband signals and calculating beamforming weight vectors on the basis of the correlation values of the correlators bank unit; a beamforming complex multiplying unit provided for a multipath searcher, the beamforming complex multiplying unit being for receiving the digital baseband signals, performing a complex multiplication for the beamforming weight vector from the beamforming unit and the digital baseband signals, and summing up them; a searchers bank unit for receiving output signals from the beamforming complex multiplying unit provided for the multipath searcher, executing a multipath search to output multipath search timing information, and inputting and outputting data from/to the beamforming unit; a beamforming complex multiplying unit for a finger, for receiving the digital baseband signals, performing a complex multiplication for the beamforming weight vector from the beamforming unit and the above respective signals, and summing up them; a finger bank unit for receiving output signals from the beamforming complex multiplying unit provided for the finger, executing a multipath tracking on the basis of the multipath search timing information of the searchers bank unit, and supplying traced multipath tracking timing information to the correlators bank unit; and a multipath combining unit for receiving output signals from the finger bank unit, performing a multipath combination for the output signals on a time base, and outputting it.

In accordance with a second inventive characteristic, a demodulator for the CDMA adaptive antenna array system is made up of a correlators bank unit for receiving digital baseband signals $r_1(k)$, $r_2(k)$,~, $r_M(k)$ received through an antenna array of a base station and computing correlation values with a local code sequence; a beamforming unit for receiving the digital baseband signals and calculating beamforming weight vectors on the basis of the correlation values of the correlators bank unit; a searchers bank unit for receiving the digital baseband signals and calculating an initial acquisition and reliable timing information for a multipath search, by a common work with the beamforming unit which uses a beamforming algorithm; a finger bank unit for receiving the digital baseband signals, executing a code tracking for an alignment between a transmission code and a phase by each multipath on the basis of the multipath search timing information by the common work with the beamforming unit, and providing the multipath tracking timing information to the correlators bank; a complex multiplying unit for complex-multiplying the digital baseband input signals of dispreaded symbol-level outputted from the finger bank unit, by the beamforming weight vectors provided from the beamforming unit, respectively, and then performing its summing-up; and a multipath combining unit for performing a multipath combination of the output signals provided from the complex multiplying unit on a time base, and outputting it.

In accordance with a third inventive characteristic, a demodulator for the CDMA adaptive antenna array system includes a correlators bank unit for receiving digital baseband signals $r_1(k)$, $r_2(k)$,~, $r_M(k)$ received through an antenna array of a base station and calculating correlation values with a local code sequence; a beamforming unit for receiving the digital baseband signals and the correlation values from the correlators bank unit, and computing beamforming weight vectors; a searchers bank unit for receiving the digital baseband signals and calculating an initial acquisition and reliable timing information for a multipath search, by a common work with the beamforming unit which uses a beamforming algorithm; a beamforming complex multiplying unit for a finger, for performing a complex multiplication for the beamforming weight vectors and the digital baseband signals, and summing up them; a finger bank unit for receiving output signals from the beamforming complex multiplying unit, executing a code tracking for an alignment between a transmission code and a phase by each multipath on the basis of the multipath search timing information to then provide the multipath tracking timing information to the correlators bank unit, and outputting signals of dispreaded multipath through a time alignment based on each path; and a multipath combining unit for receiving output signals from the finger bank unit, performing a multipath combination for output signals provided from the finger bank unit on a time base, and outputting it.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Reference will now be made in detail to the preferred embodiments of the present invention, examples of which are illustrated in the accompanying drawings.

A cell in a mobile radio communication system applied to the present invention is constructed by one base station and numerous mobile stations, and such cells based on a plural number are gathered to construct a radio part of the whole mobile radio communication network.

In the invention, the base station has an antenna array, which is applicable to all of reception and transmission. Individual cell is subdivided into two or more sectors, and herewith the transmission/reception antenna arrays exist by the respective sectors. The antenna array may be provided in a linear, circular, flat or the other type according to its application field, and is constructed by locating antenna array elements of the M number, more than two elements, by around half-wavelength distance. RF signals are down-converted into signals of an appropriate IF band, and these signals are again down-converted into analog signals of baseband. Such baseband analog signals are sampled and quantized by ADCs, and are converted into digital baseband signals, $r_1(k)$, $r_2(k)$,~, $r_M(k)$, wherein k represents a time index of a discrete signal and the digital baseband signal may be constructed by an in-phase component I and a quadrature component Q.

Figure 1:
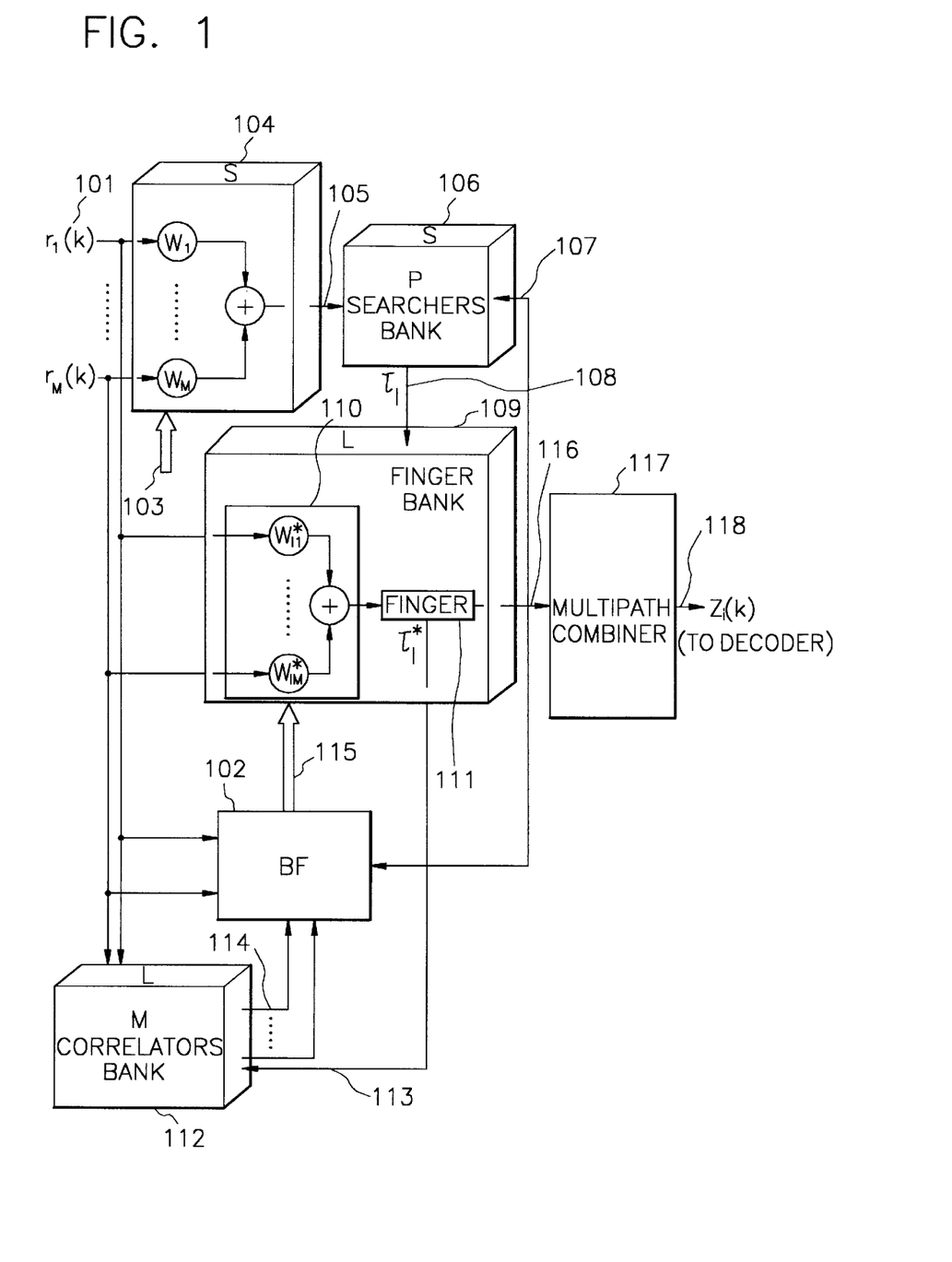
FIG. 1 shows an embodiment for a demodulator having a selection of a chip-level beamforming in a CDMA adaptive antenna array system.

Describing more in detail with reference to the drawings, FIG. 1 represents an embodiment of a demodulator for selecting a chip-level beamforming in a CDMA system having an antenna array, and as shown in FIG. 1, input signals 101 of spreaded chip-level are multiplied by beamforming weight vectors 103, 115. A signal transmitted from a mobile station within a cell is transferred to an antenna array of a base station having antenna array elements of the M number, and is down converted in frequency into baseband signals, and after that, the converted signals become sampled and quantized digital baseband signals, $r_1(k)$, $r_2(k)$, ~, $r_M(k)$ 101 and also become input signals of a chip-level beamforming demodulator.

The input signals 101 are generally over-sampled by a natural number, more than a code rate in a transmitter of the mobile station, so is used for a multipath search and a multipath tracking. If the total number of the mobile stations activated within a corresponding cell is U, the number of the base station channel cards should be more than U at least under the consideration of a handoff etc. FIG. 1 shows one embodiment of a chip-level beamforming demodulator existing in a channel card for demodulating signals transmitted from an i-th mobile station.

Though FIG. 1 shows only a path of data, a specific control path can be constructed by using a micro controller or a digital signal processor (DSP) in actually embodying that demodulator.

The (M×1) digital baseband signals 101 become input signals inputted to a beamformer 102 for calculating beamforming weight vectors, an (M×L) correlators bank 112 for providing correlation values with local code sequence, beamforming multipliers 104 for a (P×S) searchers bank 106 which performs a multipath search, and beamforming multipliers 110 provided within a (1×L) finger bank 109 which executes a multipath tracking.

The demodulator shown in FIG. 1 includes the (M×L) correlators bank 112 for receiving the (M×1) digital baseband signals $r_1(k)$, $r_2(k)$,~, $r_M(k)$ 101 and computing the correlation values with the local code sequence; the beamformer 102 for receiving the (M×1) digital baseband signals $r_1(k)$, $r_2(k)$,~, $r_M(k)$ 101 and calculating the beamforming weight vectors on the basis of the correlation values of the correlators bank 112; the beamforming multipliers 110 for a finger, for receiving the (M×1) digital baseband signals $r_1(k)$, $r_2(k)$,~, $r_M(k)$ 101, multiplying beamforming weight vectors 115 of the beamformer 102 by each signal, and summing up them; the beamforming multipliers 104 for searchers bank, for receiving the (M×1) digital baseband signals $r_1(k)$, $r_2(k)$,~, $r_M(k)$ 101, multiplying beamforming weight vectors 103 of the beamformer 102 by each signal, and summing up them; the (P×S) searchers bank 106 for receiving output signals 105 from the beamforming multipliers 104 and executing the multipath search; the finger bank for receiving output signals of the beamforming multipliers 110 for the finger, performing the multipath tracking on the basis of an output signal 108 of the searchers bank 106, for example, the multipath search timing information, and supplying the multipath tracking timing information to the correlators bank 112; and a multipath combiner 117 for receiving a multipath tracked signal of the finger bank, performing a multipath combining, and outputting it.

In the demodulator having a selection of the chip-level beamforming by the structure of FIG. 1, the beamformer 102 generates the beamforming weight vectors 103 for the P searchers bank 106 and the beamforming weight vectors 115 for the finger bank 109 by using the received input signals 101, input data 107 from the P searchers bank 106 and input data from the M correlators bank 112, and sends them to the beamforming multipliers 104 for the P searchers bank 106 and the beamforming multipliers 110 for fingers 111.

If the number of subsectors is S in a state that one sector within the cell is subdivided into two or more subsectors, a dimension of the beamforming weight vectors 103 for the P searchers bank 106 becomes (M×S), and a dimension of the beamforming weight vectors 115 for the finger bank 106 becomes (M×L). In general, the beamforming weight vectors 103 for the P searchers bank 106 are computed on the basis of the multipath searching information, and the beamforming weight vectors 115 for the finger bank 109 are calculated on the basis of more precise multipath tracking information.

The beamforming weight vectors 103, 115 are no need to be calculated every code sequence, and may be renewed by considering the fading rate of the channel in space and time domain. In this case, the same beamforming weight vectors multiply several input data.

In the structure of FIG. 1, the beamforming for the P searchers bank 106 is gained by a selection diversity, wherein the selection diversity indicates a method for pre-storing the beamforming weight vector corresponding to each subsector provided within one sector which is within the cell, in the inside of the beamformer 102 so as to select beamforming weight vector of one (M×1) set among them and use it.

Thus, if the number of necessary searchers is P in order to finish an initial acquisition and a multipath search by satisfying enough resolution within a given time in a general CDMA system which does not have an application of the antenna array, the total number of the necessary searchers is P*S in case of the demodulator based on the selection of the chip-level beamforming shown in FIG. 1. In all cases of the initial acquisition mode and the multipath search mode, the P searchers bank 106 of the S number receives the (M×1) beamforming weight vectors 103 of the S number from the beamformer 102, and transfer a S set of correlation results 107, corresponding to each (M×1) beamforming weight vector, with the local code sequence to the beamformer 102 or a micro controller not shown in FIG. 1. The (M×1) beamforming weight vectors 103 of the S number, which are available to be calculated previously, may be changed in their values according to a kind of the cells, the construction of the ground where the cell is embodied, or a direction of the cell. Therefore though the beamformer 102 provides its values in order for an operational flexibility, a fixed hardware can be also embodied within the beamforming multiplier 104. The beamformer 102 or the micro controller not shown in FIG. 1 searches for the subsector index corresponding to the largest correlation value among them and also searches for the initial acquisition or timing information for the multipath search from a correlation value with such subsector index among (1×S) signals 105 inputted to the P searchers bank 106, and then feedbacks it to the P searchers bank 106. Then the P searchers bank 106 sends this multipath search timing information 108 to the finger bank 109.

In the construction different from the above, further, such beamforming for the searcher of the selection diversity type may be provided by using the beamforming weight vector 103 based on each subsector transferred from the beamformer 102, directly determining the timing information corresponding to a correlation value which is over a determined threshold, among all the correlation values, as timing information concerned with the initial acquisition or the multipath search instead of an information use for deciding the subsector index, thereby utilizing it as the initial acquisition information in a case of an initial acquisition, or sending it to the finger bank 109 in a case of the multipath search timing information 108.

The beamforming weight vectors 115 for the finger bank 109 which is for the multipath tracking, are calculated by using an (M×L) correlation values 114 provided from the M correlators bank 112 of the L number which are based on the more precise (1×L) multipath tracking timing information 113. That is, in case the P searchers bank 106 is in the initial acquisition mode, the beamformer 102 generates only the beamforming weight vectors 103 for the P searchers bank 106, but in case the P searchers bank 106 is in the multipath search mode, the beamformer 102 should perform not only a generation of the beamforming weight vectors 103 for the P searchers bank 106 but also an operation concerned with a generation of the beamforming weight vectors 115 for the finger bank 109. Correlation values 114 inputted from the M correlators bank 112 to the beamformer 102 are generally obtained by an accumulated calculation result within several code chip period, therefore its data rate becomes 1/(the number of accumulated chips) of the code rate of the transmission mobile station.

As beamforming algorithms capable of being used in the beamformer 102, there are spatial reference beamforming methods such as MUSIC, ESPRIT etc., temporal reference beamforming methods such as DSMI(Direct Sample Matrix Inversion), LMS, RLS, Conjugate Gradient etc., and blind beamforming methods such as FA(Finite Alphabet) Algorithm, Cyclostationary Algorithm, CMA(Constant Modulus Algorithm) using an original nature of a signal, etc., and others. Among these methods the temporal reference beamforming methods in which a code sequence already existing in the CDMA system can be easily used as a temporal reference signal without a specific reference signal, is becoming influential as one appropriate beamforming method applicable to the CDMA system.

Complex multipliers of (M×S) construct the beamforming multiplier 104 for the P searchers bank 106, and herewith a real number and an imaginary number of a complex are components corresponding to each of I channel and Q channel. The signals 101 inputted to the beamforming multiplier 104 generally are the signals oversampled by a natural number than a code rate of the transmission mobile station, thus the signals 101 become a decimation by a necessary data rate, and then are inputted to each block. In case the complex multipliers of (M×S) process such signals 101, requirement for a speed of each multiplier becomes same as the code rate of the mobile station, so multipliers of a high speed are needed.

Excepting terms concerned with the input/output signals 107 from/to the beamformer 102 for the selection diversity, the P searchers bank 106 operates similarly to the searchers of a general CDMA system to which the antenna array is not applied, and decides P as the number of the searchers under a consideration of the multipath search time and the search resolution. The multipath search timing information 108 as the result of the multipath search gained on the basis of a result of the selection diversity is transmitted to the finger bank 109 to execute more precise multipath tracking. In this multipath search, it may be used one out of such methods as a maximum likelihood detection or a parallel detection, or these properly mixed hybrid detection, etc. The signals in the predicted multipath and the correlation values with the local code sequence are computed, and only in case its computed value is larger than a predetermined threshold, it is recognized as a reliable multipath search timing information 108.

The finger bank 109 operates equally to the finger bank of the general CDMA system not having an application of the antenna array, excepting the beamforming multiplier 110 for the finger bank, and performs more precise multipath tracking for the respective multipath search timing information 108 provided from the P searchers bank 106, and then sends the tracked multipath timing information 113 to the M correlators bank 112. In general, the finger 111 receives the timing information 108 for the multipath search of the L number allotted by the P searchers bank 106, namely phase information of the transmission codes, and executes the code tracking in order to coincide of the phase with the transmission code by each multipath more minutely by using a delay locked loop(DLL), a tau-dither loop(TDL), or these transformed structure. This minutely tracked code sequence is regarded as a transmitted code sequence and is used for a despreading of signals such as a traffic etc. Only the complex multipliers of (M×L) construct the beamforming multiplier 110 for the (1×L) fingers 111. Also, like as the case of the beamforming multiplier 104 for the P searchers bank 106, requirements for a speed of the beamforming multiplier 110 for the finger which processes the signals generally decimated and inputted, become same as the code rate of the mobile station, thus high speed multipliers are needed. The signals such as this formed and dispreaded traffic of (1×L), etc. represent signals in each multipath, and the signals become output signals 116 of the finger bank 109 through a time alignment procedure by each path, and these signals are inputted to the multipath combiner 117 for combining them on a time base. In a case of a coherent method using pilot signals by each mobile station, the finger 111 performs a phase correction in each path. The finger 111 also executes a frequency tracking on each path and measured frequency error components are transferred to the multipath combiner 117 of a next stage.

The M correlators bank 112 transfers the correlation values of the received input signals 101 with the local code sequence corresponding to the multipath tracking time information 113 provided from the finger bank 109, to the beamformer 102, thereby the beamformer 102 generates the (M×L) beamforming weight vectors 115 for the finger bank 109. Such existence of the M correlators bank 112 is provided so that several kinds of correlation values calculated in the finger bank 109 do not need to be stored separately.

The multipath combiner 117 for combining information of the temporal region performs a combination for these (1×L) output signals 116 through an equal gain combining (EGC) or a maximum gain combining(MGC), or other methods, to then generate an output $z_t(k)$ 118. This output is decoded by a decoder separately set on a rear stage of FIG. 1 and is decided as one information out of '0' and '1' by a slicer, and then is outputted. Further, the multipath combiner 117 executes a combination within the temporal region, concerning an error component of frequency based on each path extracted by the finger 111, and the extracted and combined frequency error signal is used as a control signal of a VCTCXO positioned in an RF stage.

The demodulator having a selection of the chip-level beamforming, shown in FIG. 1, is applicable to all cases, namely a transmission signal of the coherent system which uses the pilot signals by each mobile station, or a transmission signal of noncoherent system which does not use the pilot signals. In the coherent system, the P searchers bank 106 and the finger 111 use the pilot signals in order to search for and track the code phase, but in the noncoherent system, they use traffic signals or a separately arranged preamble signals in order for the same object above. In this case, accumulation period of data for calculating the correlation values in the P searchers bank 106 and the finger 111 may be different from each other according to each system. In using the orthogonal code such as a walsh code or a specific code for an identification of user, a decovering for this is additionally performed in the P searchers bank 106 and the finger 111.

Figure 2:
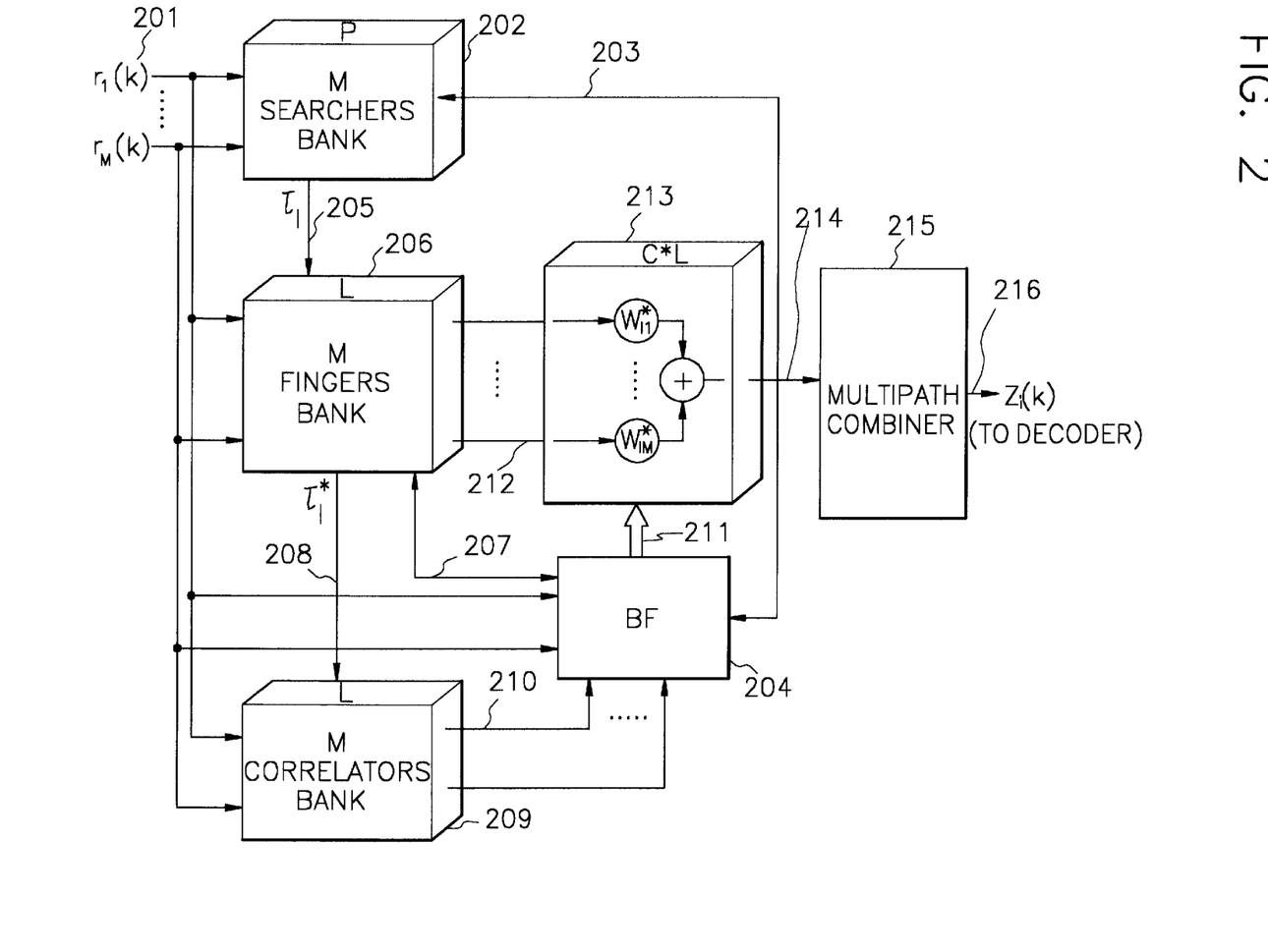
FIG. 2 shows an embodiment for a demodulator having a selection of a symbol-level beamforming in the CDMA adaptive antenna array system.

FIG. 2 shows another embodiment for a demodulator having a selection of the symbol-level beamforming in the CDMA system having the antenna array in accordance with the present invention. Differently from FIG. 1, it can be noted that a beamforming weight vector 211 is multiplied by signals 212 of the dispreaded symbol-level traffic etc. There is a shortcoming that an overall hardware-complicated extent is increased by the number of the fingers increased definitely, in comparison with the demodulator having the selection of the chip-level beamforming shown in FIG. 1. However, an influence of the finite word-length effects becomes small by multiplying the beamforming weight vector 211 by the signals 212 of the dispreaded symbol-level traffic etc., in comparison with the demodulator having the selection of the chip-level beamforming shown in FIG. 1.

In FIG. 2, furthermore, more reliable initial acquisition and timing information 205 for the multipath search are calculated by respectively using the (M×P) searchers bank instead of the beamforming by the (P×S) searchers bank 106 through the selection diversity provided in FIG. 1.

FIG. 2 has functions similar to FIG. 1, especially functions of an (M×1) signals 201, multipath search timing information 205, multipath tracking timing information 208, an M correlators bank 209, correlation values 210 inputted to the beamformer, beamforming weight vectors 211, an output 214 of the beamforming multiplier, a multipath combiner 215, and an output $z_i(k)$ 216, which are provided in FIG. 2 are similar to that of the input signals 101, the multipath search timing information 108, the multipath tracking timing information 113, the M correlators bank 112, the correlation values 114 inputted to the beamformer, the beamforming weight vectors 115, the output signal 116 of the finger bank, the multipath combiner 117, and the output $z_i(k)$ 118, which are provided in FIG. 1. Thus, a specific functional description for them is herewith omitted. Like as FIG. 1, though FIG. 2 depicts only for the data path, a specific control path can be constructed by using the micro controller or the DSP in embodying the invention.

The beamformer 204 receives correlation values 203 with a local code sequence from the M searchers bank 202, and calculates reliable initial acquisition and timing information for multipath search from information concerning of these correlation values, by using a beamforming algorithm.

This timing information is feedback to the M searchers bank 202, and is again inputted to the M fingers bank 206, then is used as the basic information for more precise multipath search. The beamforming for the M fingers bank 206 is progressed similarly to that, and only, a step of computing the beamforming weight vectors 211 based on the multipath tracking timing information 208 is added to an operational role of the beamformer 204. That is, the beamformer 204 receives correlation values 207 of received input signals 201 with the tracked code sequence from the M fingers bank 206, and calculates the timing information concerning of the reliable multipath tracking by using the beamforming algorithm. Such timing information 207 is feedback to the M fingers bank 206, and is again inputted to the M correlators bank 209 in order to compute the correlation values at the tracked multipath timing. A role division of the micro controller not shown in FIG. 2 may also perform these procedures described above.

The M searchers bank 202 executes the multipath search same as the step performed in the general searcher, concerning of each (M×1) signal 201. Accordingly, in the hardware required for the sake of a searcher beamforming in FIG. 2, the number of the total searchers is M*P, meantime in a case of FIG. 1, the number of the searchers is P*S, and the number of high speed complex multipliers operating at a speed of code rate provided in the mobile station is M*S.

Thus, in case the number S of the subsectors is same as the number M of the antenna array elements, more hardwares are required for the searcher beamforming of FIG. 1. In FIG. 2, using searchers of the M number may increase a degree of freedom for the multipath search.

The M fingers bank 206 executes the multipath tracking same as that in the general finger, concerning each of the inputted (M×1) signal 201. That is, the number of total fingers required is M*L, which makes the hardware increased by M times in its complication extent, in comparison with the number L of the fingers desired in FIG. 1. Using the fingers of the M number can increase the degree of freedom for the multipath tracking. The signals 212 of (M×L) dispreaded traffic etc outputted from the M fingers bank 206 are inputted to the beamforming multiplier 213.

If the number of channels simultaneously transmitted from the mobile station to the base station is C, excepting of the pilot channel, a function in the (M×(C*L)) complex beamforming multipliers 213 is similar to that in the complex beamforming multipliers 104 and 110 shown in FIG. 1. But, as the multipliers 213 performs multiplication by the beamforming weight vectors 211 concerning of the dispreaded signals 212, the requirement for an operational speed of the multiplier is largely moderated differently from the complex beamforming multipliers 104 and 110 shown in FIG. 1. Accordingly, the extent of complication in hardware can be lessened by using the high-speed multiplier through a time sharing or by installing an arithmetic logic unit(ALU) for use of specific multiplications. An output 214 of the beamforming multiplier 213 is inputted to the multipath combiner 215.

The demodulator having a selection of the symbol-level beamforming, shown in FIG. 2, is applicable to all cases, namely a transmission signal of the coherent system which uses the pilot signals by each mobile station, or a transmission signal of noncoherent system which does not use the pilot signals, like as the demodulator having the selection of the chip-level beamforming provided in FIG. 1.

Figure 3:
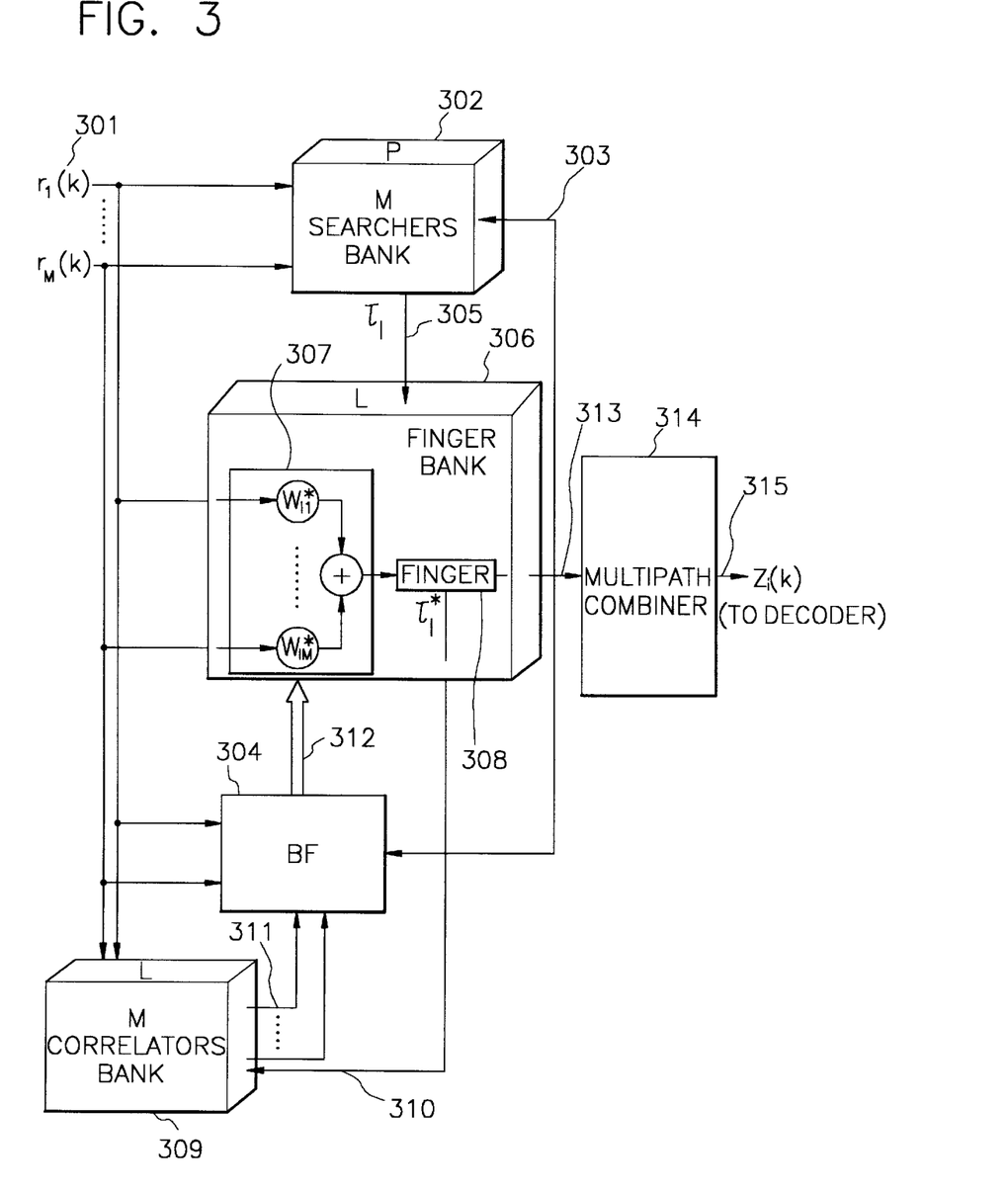
FIG. 3 shows an embodiment for a chip-level beamforming demodulator having a symbol-level searcher beamforming in the CDMA adaptive antenna array system.

FIG. 3 shows the other embodiment based on the compromised structure of demodulators shown in FIGS. 1 and 2 in the invention. FIG. 3 depicts an embodiment for a chip-level beamforming demodulator having a symbol-level searcher beamforming in the CDMA system based on the antenna array. In the searcher beamforming provided in FIG. 3, it is used the method of the demodulator having a selection of the symbol-level beamforming shown in FIG. 2, and other parts in FIG. 3 are same as the operational principle of the demodulator having a selection of the chip-level beamforming of FIG. 1. In other words, the beamforming for the M searchers bank 302 is preformed in the symbol-level and the beamforming for the finger bank 306 is executed in the chip-level.

In the demodulator of FIG. 3, an overall hardware complication extent is reduced in comparison with the demodulator based on the symbol-level beamforming of FIG. 2. At the same time, more reliable initial acquisition and the timing information 305 for the multipath search are generated by using the beamforming algorithm as in FIG. 2 instead of a use of the searcher beamforming by the selection diversity of FIG. 1. That is to say, the hardware-complicated extent of the chip-level beamforming demodulator based on the symbol-level searcher beamforming of FIG. 3, is similar to a case of the demodulator selecting the chip-level beamforming, by the searchers of the M*P number, the fingers of the L number, the complex multipliers of the M*L number operating at the speed same as the code rate of the transmission mobile station, and the correlators of the M*L number.

FIG. 3 has functions similar to FIG. 1, especially functions of input signals 301, a finger bank 306, complex multipliers 307, a finger 308, an M correlators bank 309, multipath tracking timing information 310, correlation values 311 inputted to the beamformer, beamforming weight vectors 312, an output signal 313 of the finger bank, a multipath combiner 314, and an output $z_i(k)$ 315, which are provided in FIG. 3 are similar to that of the input signals 101, the finger bank 109, the complex multipliers 110, the finger 111, the M correlators bank 112, the multipath tracking timing information 113, the correlation values 114 inputted to the beamformer, the beamforming weight vectors 115, the output signal 116 of the finger bank, the multipath combiner 117, and the output $z_i(k)$ 118, which are provided in FIG. 1.

An M searchers bank 302, input/output signals 303 between the M searchers bank and the beamformer, a beamformer 304, and multipath search timing information 305, which are provided in FIG. 3, respectively have functions similar to the M searchers bank 202, the input/output signals 203 between the M searchers bank and the beamformer, the beamformer 204, and the multipath search timing information 205, which are provided in FIG. 2. Thus, a specific functional description for them is herewith omitted. Like in FIGS. 1 and 2, though FIG. 3 depicts only for the data path, a specific control path can be constructed by using the micro controller or the DSP in embodying the invention.

The chip-level beamforming demodulator having the symbol-level searcher beamforming, shown in FIG. 3, is applicable to all cases, namely a transmission signal of the coherent system which uses the pilot signals by each mobile station, or a transmission signal of noncoherent system which does not use the pilot signals, like as the demodulator having the selection of the chip-level beamforming provided in FIG. 1 or the demodulator having the symbol-level beamforming of FIG. 2.

All the structures mentioned above are applicable to a beamforming of a signal transmitted from a base station having an antenna array of a CDMA system to a mobile station, and are also usable by the same concept in the mobile station having the antenna array.

As aforementioned, in accordance with the present invention, all information necessary for time and space can be extracted and combined in a hardware-efficient demodulator for a CDMA adaptive antenna array system. The CDMA system having the antenna array in the base station which selects the demodulator of the inventive efficient structure, can provide an increase of coverage, an increase of a system capacity, and a data service of high speed, etc., in comparison with a CDMA system not having the antenna array, just with a proper complication extent in the base station. Accordingly, an effect of wider influence is generated not only in IMT-2000 but also in WLL, ITS and a future type radio communication system such as mobile multimedia etc. Furthermore, an additionally inventive application to other fields is available, for example, a location of the mobile station can be grasped by more improved precision since the invention is directly applicable to a location tracking system.

It will be apparent to those skilled in the art that various modifications and variations can be made in the hardware-efficient demodulator of the CDMA adaptive antenna array systems of the present invention without deviating from the spirit or scope of the invention. Thus, it is intended that the present invention covers the modifications and variations of this invention provided they come within the scope of the appended claims and their equivalent.

What is claimed is:

1. A demodulator for a CDMA adaptive antenna array system comprising:

correlators bank means for receiving digital baseband signals of a chip-level received through an antenna array of a base station and computing correlation values with a local code sequence;

beamforming means for receiving the digital baseband signals and calculating beamforming weight vectors on the basis of the correlation values of said correlators bank means;

beamforming complex multiplying means for a multipath searcher, for receiving the digital baseband signals, performing a complex multiplication for the beamforming weight vector from said beamforming means and the respective signals, and summing up them;

searchers bank means for receiving output signals from said beamforming complex multiplying means provided for the multipath searcher, executing a multipath search to output multipath search timing information, and inputting and outputting data from/to said beamforming means for a selection diversity;

beamforming complex multiplying means for a finger, for receiving the digital baseband signals, performing the complex multiplication for the beamforming weight vector from said beamforming means and the respective signals, and summing up them;

finger bank means for receiving output signals from said beamforming complex multiplying means provided for the finger, executing a multipath tracking on the basis of the multipath search timing information of said searchers bank means, and supplying traced multipath tracking timing information to said correlators bank means; and multipath-combining means for receiving output signals from said finger bank means, performing a multipath combination for the output signals on a time base, and outputting it.

2. The demodulator of claim 1, wherein said beamforming means prestores the beamforming weight vectors corresponding to each subsector within one sector of a cell therein; receives correlation results with the local code sequence of a subsector set for each beamforming weight vector from said searchers bank means and searches for the subsector index corresponding to the largest correlation value; searches for initial acquisition or the timing information for the multipath search from correlation values with a signal concerned with the subsector index to feedback it to said searchers bank means; and generates the beamforming weight vectors by the selection diversity in which the beamforming weight vector of one set among the beamforming weight vectors corresponding to each subsector is selected and used.

3. The demodulator of claim 1, wherein said beamforming means generates the beamforming weight vectors for said searchers bank means and the beamforming weight vectors for the finger bank by using the digital baseband signals, input data from said searchers bank means and input data from said correlators bank means and sends the generated beamforming weight vectors to said beamforming complex multiplying means for said searchers bank means and said beamforming complex multiplying means for the finger.

4. The demodulator of claim 1, wherein said searchers bank means determines the timing information corresponding to the correlation value which is over a predetermined threshold among all the correlation values, as timing information concerned with the initial acquisition or the multipath search, by using the beamforming weight vectors provided from said beamforming means.

5. The demodulator of claim 1, wherein said correlators bank means generates the correlation values obtained by a calculation result accumulated within several code chip period on the basis of the multipath tracking timing information provided from said finger bank means, and sends the values to said beamforming means, so that it is no need to store several correlation values in said searchers bank means or said finger bank means.

6. A demodulator for a CDMA adaptive antenna array system comprising:

correlators bank means for receiving digital baseband signals received through an antenna array of a base station and computing correlation values with a local code sequence;

beamforming means for receiving the digital baseband signals and calculating beamforming weight vectors on the basis of the correlation values of said correlators bank means;

searchers bank means for receiving the digital baseband signals and calculating an initial acquisition and reliable timing information for a multipath search, by a common work with said beamforming means which uses a beamforming algorithm;

finger bank means for receiving the digital baseband signals, executing a code tracking for an alignment between a transmission code and a phase by each multipath on the basis of the multipath search timing information by the common work with said beamforming means, and providing the multipath tracking timing information to said correlators bank means;

complex multiplying means for complex-multiplying the digital baseband input signals of dispreaded symbol-level outputted from said finger bank means, by the beamforming weight vectors provided from said beamforming means, respectively, and then performing its summing-up; and multipath combining means for performing a multipath combination of the output signals provided from said complex multiplying means, on a time base, and outputting it.

7. A demodulator for a CDMA adaptive antenna array system comprising:

correlators bank means for receiving digital baseband signals received through an antenna array of a base station and computing correlation values with a local code sequence;

beamforming means for receiving the digital baseband signals and the correlation values from said correlators bank means, and computing beamforming weight vectors;

searchers bank means for receiving the digital baseband signals and calculating an initial acquisition and reliable timing information for a multipath search, by a common work with said beamforming means which uses a beamforming algorithm;

beamforming complex multiplying means for a finger, for performing a complex multiplication for the beamforming weight vectors and the digital baseband signals, and summing up them;

finger bank means for receiving output signals from said beamforming complex multiplying means, executing a code tracking for an alignment between a transmission code and a phase by each multipath on the basis of the multipath search timing information to then provide the traced multipath tracking timing information to said correlators bank means, and outputting signals of dispreaded multipath through a time alignment based on each path; and multipath combining means for performing a multipath combination of output signals provided from said finger bank means on a time base, and outputting it.

* * * * *